US006715733B2

(12) United States Patent
Wang et al.

(10) Patent No.: US 6,715,733 B2
(45) Date of Patent: Apr. 6, 2004

(54) HIGH TEMPERATURE MICRO-MACHINED VALVE

(75) Inventors: Tak Kui Wang, Havertown, PA (US); Peisheng Sheng, Wilmington, DE (US); Richard P. White, Glen Mills, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 190 days.

(21) Appl. No.: 09/924,371

(22) Filed: Aug. 8, 2001

(65) Prior Publication Data

US 2003/0030023 A1 Feb. 13, 2003

(51) Int. Cl.[7] .................................................. F16K 1/00
(52) U.S. Cl. ............. 251/331; 251/129.01; 251/129.06; 137/859
(58) Field of Search ................ 251/11, 129.01, 251/129.06, 331; 137/859

(56) References Cited

U.S. PATENT DOCUMENTS

| 4,624,286 | A | * | 11/1986 | Frohn | 137/859 |
| 6,003,835 | A | * | 12/1999 | Moller | 251/61.1 |
| 6,056,269 | A |   | 5/2000  | Johnson et al. | 251/331 |
| 6,109,889 | A | * | 8/2000  | Zengerle et al. | 417/413.2 |
| 6,227,824 | B1 | * | 5/2001 | Stehr | 417/540 |
| 6,412,751 | B1 | * | 7/2002 | Wang | 251/61.1 |

FOREIGN PATENT DOCUMENTS

EP          0 789 146 A1 * 8/1996    ........... F04B/43/02

OTHER PUBLICATIONS

Terry, Stephen Clark, "A Gas Chromatography System Fabricated on a Silicon Wafer Using Integrated Circuit Technology", Dissertation submitted to Dept. of Elec. Eng. of Stanford University, May 1975.

* cited by examiner

*Primary Examiner*—Gene Mancene
*Assistant Examiner*—Melvin Cartagena

(57) ABSTRACT

Micro-valves that include a diaphragm capable of being positioned on a valve seat or removed from the valve seat. The micro-valves also include supports and a cover that restrict the motion of the diaphragm, thereby reducing the possibility of cracking. Micro-valves made by anodically bonding the diaphragm to a seat substrate and anodically bonding the cover to the diaphragm. Micro-injectors that include micro-valves. Also, methods of making the micro-valves and micro-injectors.

10 Claims, 5 Drawing Sheets

HIGH TEMPERATURE MICRO-MACHINED VALVE

BACKGROUND OF THE INVENTION

1. Field of the Invention

The present invention relates to micro-machined valves capable of regulating flow in micro electromechanical systems (MEMS) devices and also relates to methods of making such valves.

2. Description of the Related Art

U.S. Pat. No. 6,056,269 to Johnson et al. (the Johnson '269 patent), incorporated herein in its entirety by reference, discloses the micro-miniature valve 5 having a silicon diaphragm illustrated in FIG. 1. The valve 5 includes a diaphragm 10, a valve body 12 (made up of a seat substrate 15 and a base 17), a valve seat 20, a well or recess 30, an orifice 40, an inlet port 50, an inlet channel 60, an outlet port 70 and an outlet channel 80. The seat substrate 15 and the diaphragm 10 are made of silicon. The base 17 is made with glass.

A recess or well 30 is formed in the seat substrate 15 by a first etch step. Inside the recess or well 30 is a valve seat 20, formed by a second etch step. Further, a third etch step is sometimes used to align the features on the front of the seat substrate 15 to the features on the back of the seat substrate 15. The inlet port 50, inlet channel 60 and outlet channel 80 are formed in the seat substrate 15 via a fourth etch step. The orifice 40 and outlet port 70 are chemically etched in the interior of the valve seat 20, by a fifth etch step, such that it extends through the seat substrate 15 and connects to the inlet port 50 and the inlet channel 60. If a double-sided aligner is used, the third etch step can be eliminated. Therefore, depending upon whether a double-sided aligner is used or not, the same piece of silicon that makes up the valve 5 is etched either four or five times.

Since each photolithography, handling and etching step inherently has associated yield problems, a few wafers are lost at each step. Assuming that each step has an associated loss of 10% of the wafers, the total yield of valves 5 according to the method discussed above is 90% raised to the power of 4 or 5. Hence, only between 59 and 66% of the valves 5 manufactured by the process described above will be operational.

In operation, the valve 5 is opened and shut by the diaphragm 10. Whether the diaphragm 10 is in the open or closed position is dependant on a control pressure applied on the top surface of diaphragm 10. When the control pressure is high, the diaphragm 10 deflects onto and forms a seal with the valve seat 20, thereby closing the valve 5. However, when the pressure is reduced, the diaphragm 10 relaxes away from the valve seat 20 and opens the valve 5.

When the diaphragm 10 is relaxed away from the valve seat 20, gas or liquid can pass into the inlet port 50, through the inlet channel 60 and out of the orifice 40. Then, the gas or liquid can flow into the recess 30 and can drain through the outlet port 70, the outlet channel 80 and out of the valve 5. When the diaphragm 10 is positioned directly atop the valve seat 20, the seal created prevents gas or liquid from flowing out of the orifice 40. Hence, neither gas nor liquid can escape via the outlet channel 80 and the valve 5 is in a closed position. In some instances, the direction of flow can be reversed, making the inlet an outlet and vice versa The diaphragm 10 can be made from a relatively thick piece of silicon bonded to the body 12 and then chemically etched from one side, leaving somewhere on the order of a 5-to 80-micron-thick diaphragm 10. However, because semiconductor-processing equipment is designed to handle wafers of certain thickness ranges, it is generally preferred to etch the diaphragm 10 before performing the bonding process. Further, a pre-etched diaphragm 10 is preferable to bonding wafers and then etching them because of wafer-to-wafer thickness variation and thickness variations at different regions on the same wafer, as discussed below.

Typically, thickness variation from one wafer to another is approximately 25 microns. This means that, in a batch of wafers specified as being 500 microns thick, some wafers may be only 487 microns thick while others may have a thickness of 512 microns. If a 500-micron etch were to be performed on all of the wafers in a batch after they were attached to a set of bodies 12, the 487-microns-thick wafers would be etched completely through while the 512-micron-thick wafers would leave 12 microns of thickness that could be used as a diaphragm 10. Hence, diaphragm 10 thickness could not be controlled precisely by standard batch manufacturing processes and the cost of manufacturing valves 5 would increase substantially.

Thickness variations at different regions on the same wafer would increase processing complexities and cost even more. Under such conditions, the diaphragm 10 could be completely etched away in some regions while too thick of a diaphragm 10 could be left in other regions. Therefore, as stated above, pre-etched diaphragms 10 are preferred.

Once a diaphragm 10 has been obtained, the fusion bonding process is used to affix the diaphragm 10 to the seat substrate 15 and to affix the seat substrate 15 to the base 17. This process requires that two very clean and flat silicon wafer surfaces be in contact with each other. Once the surfaces are in contact, the bonding process starts and a strong bond can be formed after annealing, typically in a high-temperature environment of greater than 1100° C. The end product of the fusion bonding process can be a silicon structure that is almost monolithic. However, according to certain types of fusion bonding, one wafer can be oxidized and placed in contact with a bare silicon wafer.

Although the fusion bonding process can theoretically produce strong bonding, certain requirements and specifications have to be met. For example, many studies on wafer specifications have been performed and the need for an approximately 5 nanometer rms surface roughness is generally accepted as being required for proper bonding.

Also, extremely clean surfaces are required in order to carry out the fusion bonding process. Generally, wafer surfaces are first treated according to the well-known RCA etch/cleaning process (developed by the RCA Corp.) and immediately thereafter are bonded together. Further, the cleanliness required for fusion bonding typically necessitates the use of a class 10 or, preferably, a class 1 clean-room environment. Because such environments are expensive to maintain, the fusion bonding process is not conducive to commercial production.

The wafer surfaces must also be free of chipping. When a wafer is chipped, the chips themselves can become bare silicon surfaces. Should the chips (or particles from the chips) fall back onto either of the wafer surfaces, a gap would inevitably remain as the surfaces are placed in contact with each other. Such a gap would render wafer-to-wafer bonding impossible. Hence, having to avoid gap formation renders the manufacturing process of the valves 5 discussed above even more problematic.

If all smoothness and cleanliness conditions discussed above are not met, the silicon-to-silicon bonds holding the diaphragm 10 to the seat substrate 15 in the valve 5 either never form or are highly susceptible to delamination. Under non-ideal conditions, even when bonds form, the bonds are weak and simply inserting one's fingernail between the two wafers causes the wafers to peel away from each other.

Assuming that ideal bonding conditions have been met, the valve 5 still has inherent design flaws that limit its use. For example, the diaphragm 10 stands a high risk of cracking during use when pressure from the top or back side of the valve 5 (opposite the body 12) is too great. Under such conditions, the diaphragm 10 is pushed against the valve seat 20 with such force that the diaphragm 10 attempts to conform to the shape of the valve seat 20. Therefore, especially at the edges of the valve seat 20, the diaphragm 10 experiences tremendous tension and the associated stress causes the diaphragm 10 to crack.

Another inherent design flaw becomes problematic when the back side of the diaphragm 10 is held at a lower pressure than the front side of the diaphragm 10. Under such conditions, the diaphragm 10 flexes away from the seat substrate 15. Since nothing prevents this flexing, the diaphragm 10 sometimes, under a sufficient reversal of pressure, flexes as much as 500 microns and cracks.

Another micro-miniature valve 6 is disclosed in the dissertation by Stephen Clark (Dissertation by Stephen Clark, Stanford University, Ph.D, E.E., May 1975, "A Gas Chromatography System Fabricated On a Silicon Wafer Using Integrated Circuit Technology", pp. 41–128. UMI Dissertation Services, Ann Arbor, Mich.), incorporated herein in its entirety by reference. The valve 6 disclosed in the Clark dissertation is illustrated in FIG. 2.

As show in FIG. 2, the Clark valve 6 includes a diaphragm 10, a base 17, a valve seat 20, an orifice 40, an inlet channel 60, an outlet port 70, an outlet channel 80, a cover 90 and a pressure inlet 310 that regulates the pressure above the diaphragm 10. The base 17, diaphragm 10 and valve seat 20 of the Clark valve 5 are made of silicon and the cover 90 is made of glass. The base 17 is bonded to the cover 90 and the diaphragm 10 is sandwiched between the valve seat 20 and the cover 90. The diaphragm 10 is also hermetically sealed to the cover 90 using glass-silicon anodic bonding.

In operation, the diaphragm 10 opens and closes the valve 6 by pressing against or relaxing away from the valve seat 20. As with the Johnson valve 5, the diaphragm 10 of the Clark valve 6 is not limited in its ability to flex away from the valve seat 20 under a back side pressure. Quite to the contrary, the diaphragm 10 is significantly detached from the cover 90, can bend backwards significantly and can therefore crack under back side pressure.

Also, like the Johnson valve 5, the diaphragm 10 of the Clark valve 6, under sufficiently large pressure, will crack as it attempts to conform to the geometry of the surface of the valve seat 20. Further, manufacturing of the base 17 alone requires four etching steps to etch the well 30, outlet channel 80, valve seat 20 and orifice 40. In other words, the Clark valve 6 operates in a manner similar to the manner in which the Johnson valve 5 operates. In addition to the disadvantages that the Johnson valve suffers, the Clark valve also requires higher precision control of etching and handling of small parts during manufacturing.

SUMMARY OF THE INVENTION

In one embodiment, a micro-valve includes a seat substrate having an outlet port and an orifice therethrough. The seat substrate includes a valve seat protruding from a well in the seat substrate, a support protruding from the well, and a diaphragm above the seat substrate.

In an alternate embodiment, a micro-valve includes a seat substrate having an outlet port and an orifice through the port. The substrate includes a diaphragm having a different material than the seat substrate and positioned above the seat substrate.

In another alternate embodiment, a method of manufacturing a first micro-valve includes steps of etching a well in a seat substrate, forming an orifice and an outlet port in the well, and anodically bonding a diaphragm to the seat substrate.

BRIEF DESCRIPTION OF THE DRAWINGS

The invention will be described by way of example, in the description of preferred embodiments, with particular reference to the accompanying drawings in which.

DETAILED DESCRIPTION OF PREFERED EMBODIMENTS

Figure 1:
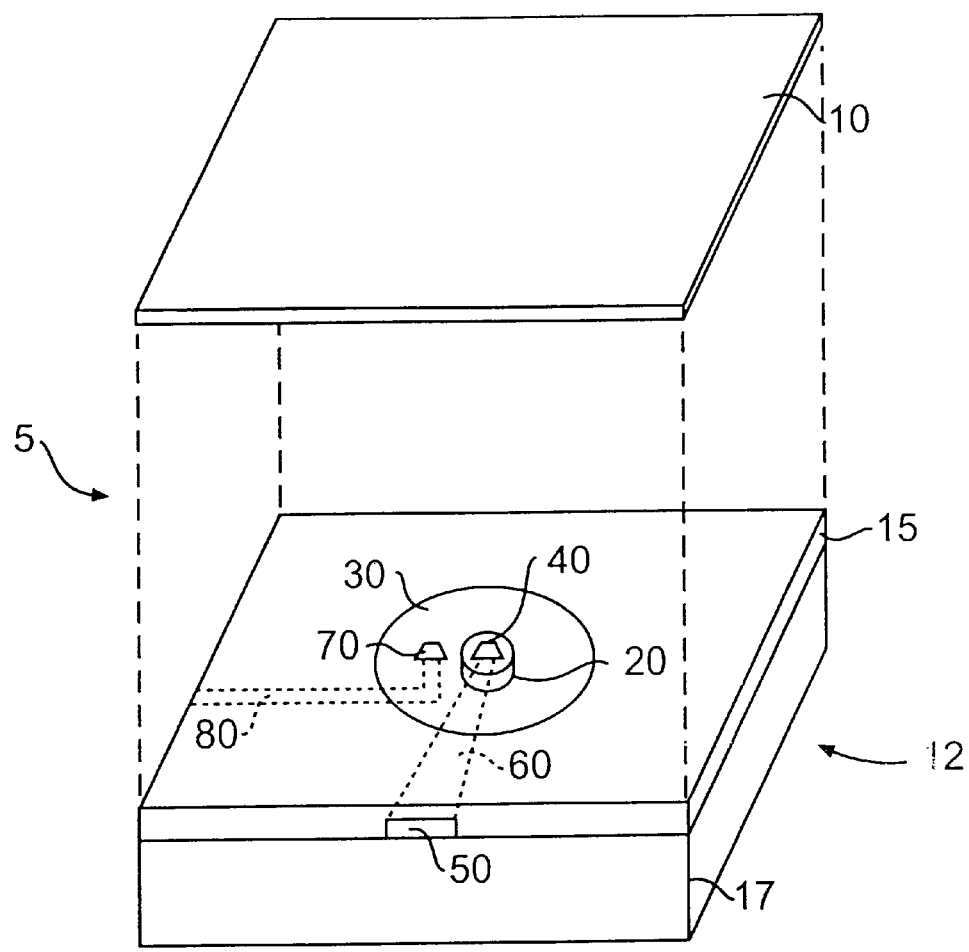
FIG. 1 is a perspective view of a known micro-machined valve.
Figure 2:
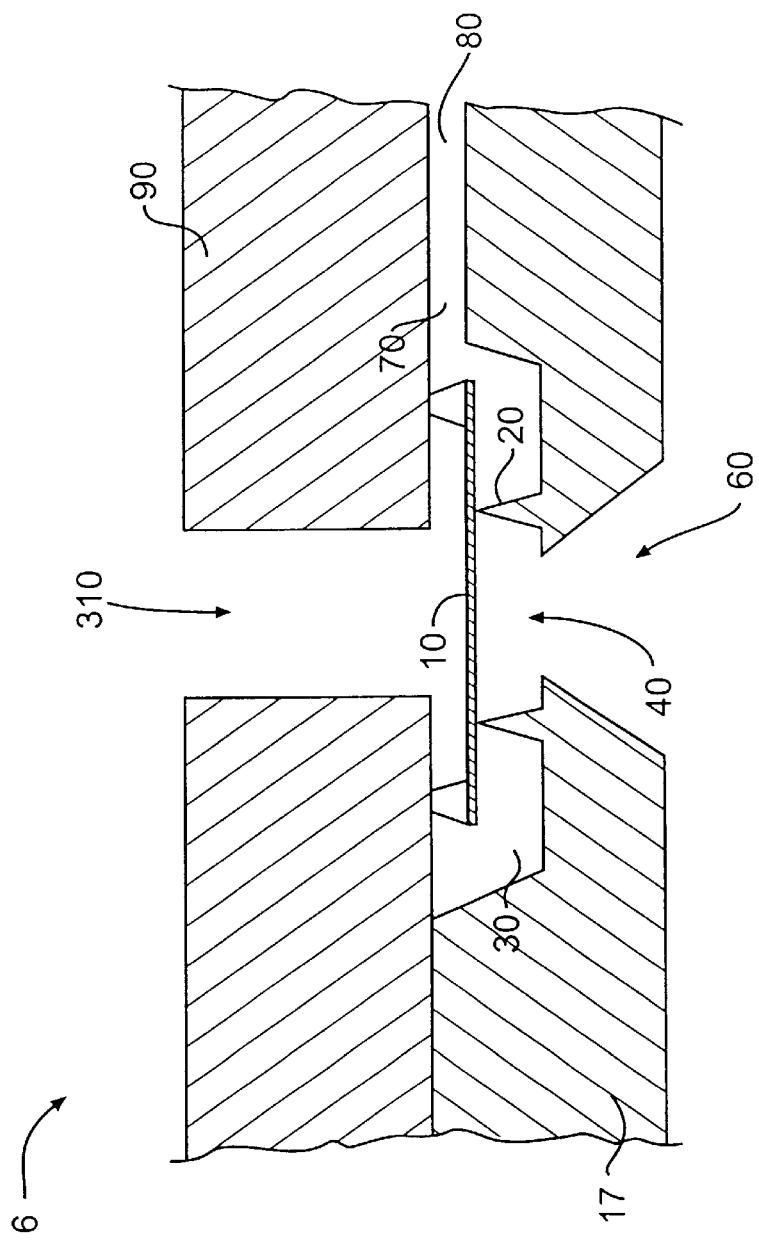
FIG. 2 is a side view of another known micro-machined valve.
Figure 3:
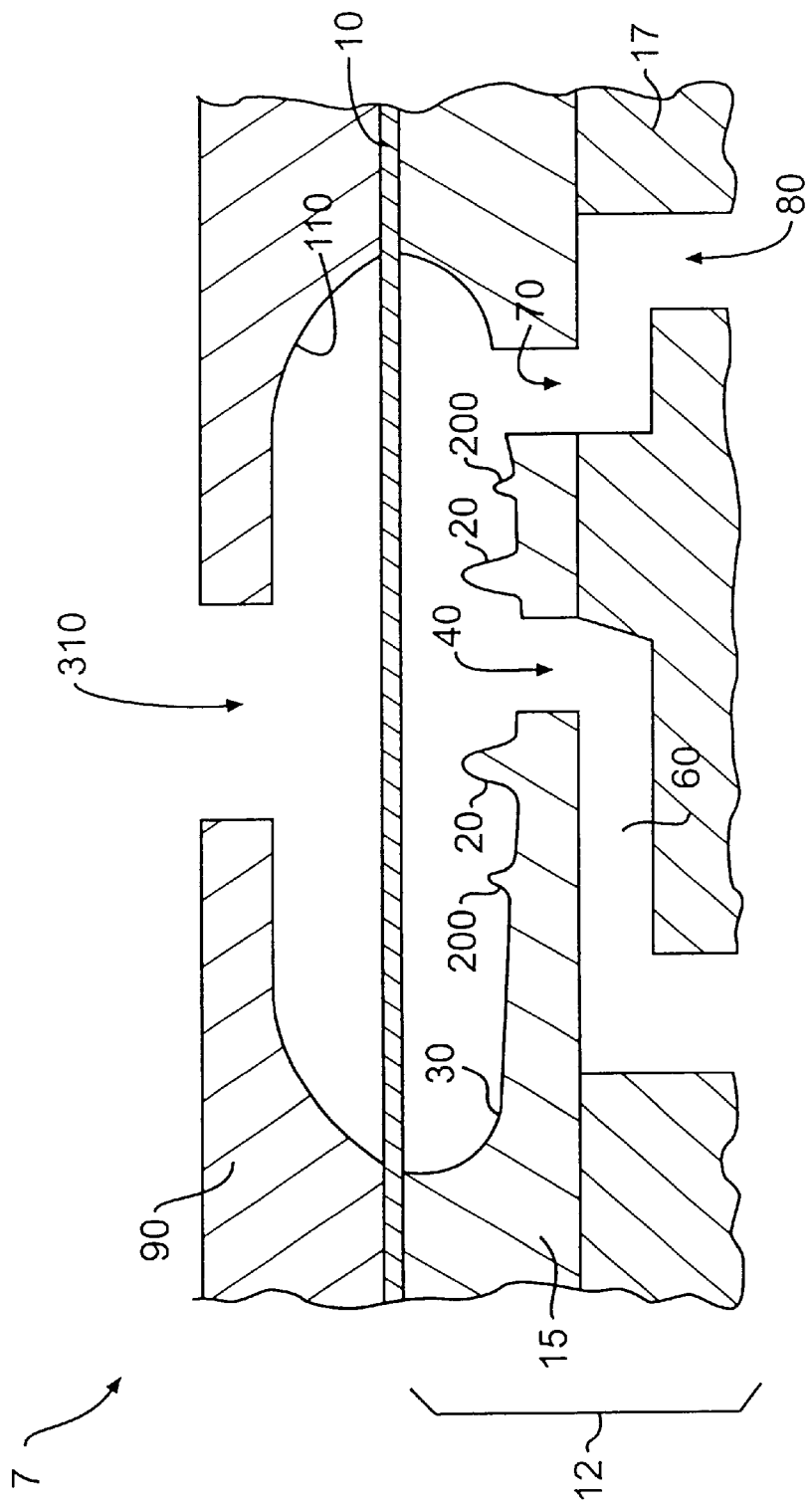
FIG. 3 is a side view illustrating a high-temperature micro-machined valve according to certain embodiments of the present invention, in which a glass seat substrate and a cover are illustrated.

FIG. 3 illustrates a valve 7 according to certain embodiments of the present invention. The valve 7 includes a diaphragm 10 positioned above a body 12 that itself is made up of a seat substrate 15 on top of a base 17. A valve seat 20, a well 30, an orifice 40, an outlet port 70 and a support 200 are formed in the seat substrate 15. An inlet channel 60 and an outlet channel 80 are formed in the base 17. A cover 90 is positioned above the diaphragm 10. In the cover 90 is formed a depression 110, and a pressure inlet 310. The valve 7 illustrated in FIG. 3 operates by allowing the diaphragm 10 to open or close the valve 7 as it moves away from and onto the valve seat 20, respectively.

The base 17 and diaphragm 10 included in the valve 7 are typically made of silicon. The seat substrate 15, valve seat 20, cover 90, and support 200 are typically made of glass. However, other materials with closely-matched coefficients of thermal expansion and/or that are capable of being used in the manufacturing process for the valve 7 detailed below are also within the scope of the present invention. The support 200 is sometimes not included in the valve 7, but it is generally preferable that this support 200 be present because the support 200, among other functions, prevents the diaphragm 10 from deflecting too far downward towards the seat substrate 15. The elevation of the support 200 relative to the seat substrate 15 can be lower than, equal to or higher than the elevation of the valve seat 20.

The diaphragm 10 is generally pre-etched and typically ranges in thickness from 10 to 25 microns. However, the most desirable thickness for the diaphragm 10 is dependant upon various factors, including the geometry of the valve 7 and of the orifice 40. Hence the thickness is generally determined by practicing the present invention on a case-by-case basis, pursuant to experimentation or other empirical evidence. However, theoretical calculations of maximum allowable deflection before the diaphragm 10 cracks can also be performed and are well known to those skilled in the art of the present invention.

The glass seat substrate 15 is preferably formed using two etches, one to at least partially form the well 30 and one to deepen selective portions of the well so as to form the valve seat 20 and support 200. The orifice 40 and the outlet port 70 are generally not formed by chemical etching. Instead, they are preferably made by methods such as, but not limited to, laser drilling, ultra-sonic drilling, and mechanical drilling.

An orifice 40 with a diameter of approximately 200 microns or less can be drilled in the seat substrate 15 with a great deal of regularity by one of the methods above. In certain circumstances, such as when there is a complete lack of vibration in the stage and drill bit, an orifice 40 with a diameter of no more than about 150 microns can be drilled in the seat substrate 15. However, the size limit of the diameter is a function of the thickness of the wafer through which the orifice 40 is drilled. With a very thin wafer, a smaller diameter hole can be drilled. For example, when an approximately one-millimeter-thick glass seat substrate 15 is used, an approximately 250-micron diameter orifice 40 can be drilled reproducibly. Although the orifice 40 is discussed in this paragraph as being circular, other geometries such as, but not limited to, triangular, trapezoidal and rectangular, are also within the scope of the present invention.

According to certain embodiments of the present invention, PYREX glass is used to make the seat substrate 15. PYREX glass is preferred since it has substantially the same thermal expansion coefficient as the silicon making up the diaphragm 10. However, other glasses and materials that have thermal expansion coefficients similar to those of silicon are also within the scope of the present invention. Examples of such glasses include, but are not limited to, PYREX glass which is a borosilicate glass from Corning, lithia potash borosilicate glass 7070 from Corning and a glass sold under the name BOROFLOAT by Schott Specialty Glass.

The base 17, preferably made up of silicon, is preferably chemically etched a single time to form the inlet channel 60, the outlet channel 80 and any other channels that may be used in other embodiments of the present invention. As will be discussed later, the base 17 can be placed upon other structures, such as wafers that have channels etched into them.

The cover 90 of valve 7 is preferably etched such that a small dent or depression 110 is formed therein. A pressure inlet 310 is also formed, preferably by one of the drilling methods described above, for applying pressure to the diaphragm 10.

When, as illustrated in FIG. 3, the cover 90 is positioned above the diaphragm 10, a small gap, typically of approximately 10 to 25 microns, is formed between the diaphragm 10 and the cover 90. This gap accommodates small deflections that the diaphragm 10 may make under a back side pressure. However, before the diaphragm 10 flexes too far away from the seat substrate 15, the cover 90 restricts the motion of the diaphragm 10. This prevents cracking of the diaphragm 10 under back pressure.

Figure 4:
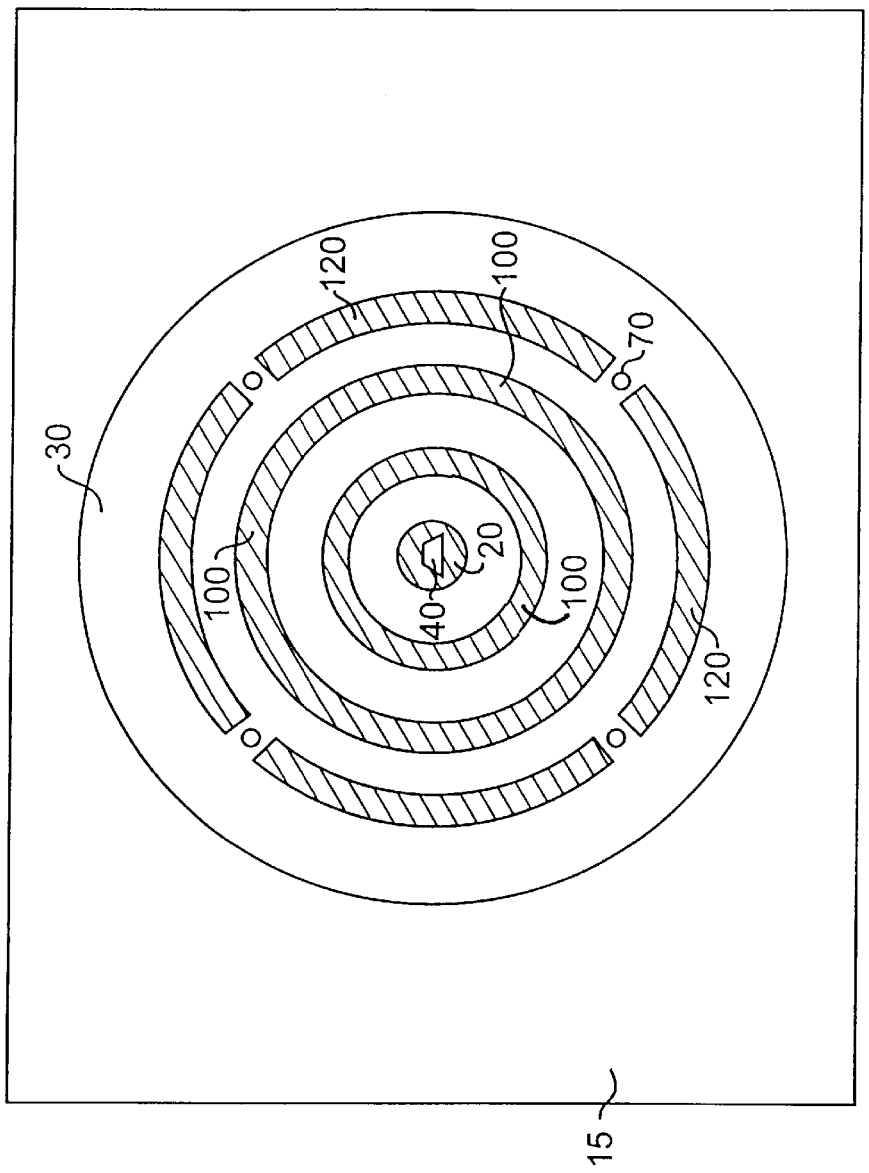
FIG. 4 is a top view of a high-temperature micro-machined valve according to certain embodiments of the present invention, in which multiple supports restrict the diaphragm's motion into the recess.

FIG. 4 is a top view of the surface of the seat substrate 15 of a valve 7 within the scope of the present invention wherein the support 200, instead of including a single ring, includes several concentric circular support segments 100 and arced support segments 120. Although circular, concentric support segments 100 are illustrated, other geometries and configurations may also be used such as, but not limited to, squares, triangles and non-concentric circles. The arced support segments 120 can also be of other geometries not illustrated in FIG. 4.

Once the diaphragm 10, seat substrate 15, base 17 and cover 90 have been formed, the seat substrate 15 and base 17 are joined or bonded together to form the body 12 of the valve 7. The diaphragm 10 is then joined or bonded to the body 12 of the valve 7. Then, the cover 90 is joined or bonded with the diaphragm 10 and, if desired, the valve 7 is placed on yet another structure such as a wafer. The valve 7, by virtue of the high melting temperatures of the materials used to make its components, can be operated at elevated temperatures.

In order to bond the cover 90 to the diaphragm 10, the diaphragm 10 to the seat substrate 15 and the seat substrate 15 to the base 17, certain embodiments of the present invention use the anodic or Mallory bonding process. This anodic bonding process reduces the required surface smoothness and required cleanliness when compared to these requirements for a silicon-to-silicon fusion bonding process. Yet, this anodic bonding process produces a strong glass-to-metal or glass-to-semiconductor bond. For example, although smooth surfaces are still desired, a 50 Å (angstrom) surface finish is not necessary for anodic bonding.

The anodic bonding process is very robust and is commercially-used to manufacture millions of pressure sensors. The anodic process generally does not require a cleaning process known in the industry as RCA clean. Instead, two surfaces are subjected to the known piranha cleaning process, dried in a spinner dryer and placed on a hotplate with their cleaned surfaces facing each other. The temperature of the hotplate is then raised to approximately 350° C. or above, a positive electrode is placed on the metal or semiconductor and a negative electrode is placed on the glass. As the voltage is raised to between approximately 400 volts and 1000 volts, the two surfaces bond together.

Turning to the operation of the valve 7, the "open" position is defined when the diaphragm 10 is displaced away from the valve seat 20 and orifice 40. In the "closed" position, the diaphragm 10 creates a seal with the valve seat 20. The seal is typically formed by applying a downward pressure on the diaphragm 10 to cause the diaphragm 10 to physically contact the valve seat 20 with sufficient force to substantially prevent leakage.

According to certain embodiments of the present invention, at least some of either the circular supports 100 or arced segments 120 of the support 200 have top surfaces disposed at the same elevation or at a higher elevation above the seat substrate 15 as the top surface of the valve seat 20. Hence, the diaphragm 10 rests against the support 200 whenever the valve 7 is closed. According to certain other embodiments, the support 200 components have top surfaces disposed at an elevation between the elevation of the substrate support 15 and that of the top surface of the valve seat 20. In these embodiments, the diaphragm 10 only rests on the support 200 when a great deal of pressure is exerted on the diaphragm 10.

Using the support 200 ensures that the diaphragm 10 remains relatively flat, even under tremendous pressure. Therefore, stress singularities and increases in stress where the diaphragm 10 is hanging on the edge of the valve seat 20 are eliminated. In configurations such as those illustrated in FIG. 4, the diaphragm 10 will not conform to each one of the structures and the stress will not cause cracking.

While the valve 7 is in the "open" position, the diaphragm 10 is raised away from the valve seat 20 and the support 200. The gas and/or liquid can travel between the orifice 40 and the outlet port 70. When the top surfaces of the circular supports 100 are at the same elevation as the top surfaces of the valve seat 20 and the valve 7 is in the "closed" position, it is possible, though not required, that additional seals form between the diaphragm 10 and the circular supports 100 such that additional barriers are created between the orifice 40 and the outlet port 70. This provides additional protection against leakage.

Although the circular supports 100 in FIG. 4 are shown to be numerous and concentric, other embodiments of the present invention are directed at valves 7 wherein as little as a single, non-circular support is used while still other embodiments use non-circular, non-concentric supports. Also, although four outlet ports 70 are positioned between the arced supports 120 in FIG. 4, neither the number of outlet ports 70 nor their positions relative to the intermediate supports 200 is limiting of the present invention, so long as a barrier is created between the orifice 40 and the outlet port 70 when the valve 7 is in the "closed" position.

Among the advantages of the valves 7 of the present invention is that, instead of at least 4 to 5 etch steps required to manufacture the Johnson valve 5 and Clark valve 6, the valve illustrated in FIG. 3 can be made with only two glass etches and only one silicon etch. If it is again assumed that etching steps have a 90% yield, the glass seat substrate 15 has an 81% yield and the silicon base 17 has a 90% yield. Since unusable components can individually be discarded, it can be seen that, based on the above-discussed statistical approximations and calculations that the overall yield of valves 7 tops 80%. This percentage constitutes a significant improvement over the 59% to 66% yields discussed earlier.

Figure 5:
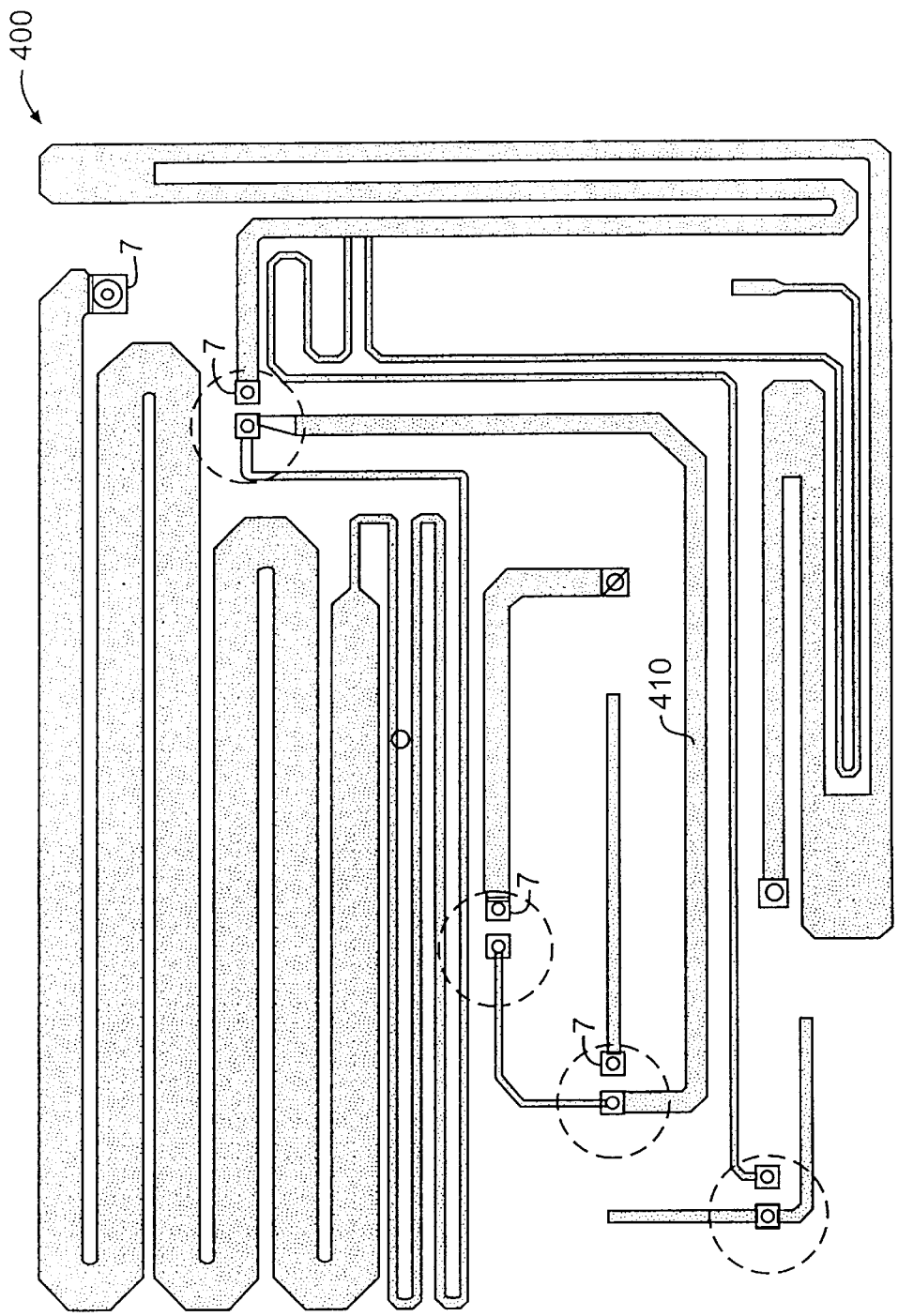
FIG. 5 is a plan view illustrating an injector application of a high-temperature micro-machined valve.

Reliable valves can be made via this robust manufacturing process. A representative application of these valves is now discussed. This application is purely exemplary and not limiting of the present invention. Specifically, FIG. 5 illustrates an injector 400 that uses high-temperature micromachined valves 7. To form the injector 400, a wafer is added below the base 17. Measurement channels 410 are formed in the wafer and used for fluidic measurement. Typically, these channels are etched in and holes are drilled through the wafer in order to connect between micromachined valves 7.

The purpose of the measurement channels may be understood with reference to the operation of a gas chromatograph that quantifies and qualifies chemical samples. The injector 400 of a gas chromatograph is responsible for measuring or injecting a known volume or known weight of a sample into the column of the chromatograph. In order to inject this known quantity of sample into the column, the injector 400 is equipped with measurement channels 410 that have valves 7 on either side thereof. Hence, a sample can be passed through a first valve 7 into the measurement channel 410. When the first valve 7 is closed, a known amount of gas or liquid is trapped in the measurement channel 410 until another valve 7 is opened, releasing the sample.

In this way, a measurement channel 410 of a known or fixed volume is provided. A sample of the gas or liquid is allowed to enter the measurement channel 410 and become trapped between two valves 7 as they are shut. Then, by opening one of the valves 7, the chromatograph operator can transfer the sample into the column where the analytical processes occur. In the alternative, the operator can open a valve 7 that allows for dumping of the sample to ambient atmosphere.

Naturally, the more accurately the measurement channel 410 in the injector 400 can be defined, the more accurate or the more repeatable the analytical results will be from use to use and from device to device. Therefore, among the reasons that the measurement channels 410 discussed above are generally made out of silicon is that silicon has very well-defined, well-understood etching characteristics.

The foregoing detailed description has been given for clearness of understanding only and no unnecessary limitations should be understood therefrom as some modifications will be obvious to those skilled in the art without departing from the scope and spirit of the appended claims and their equivalents.

What is claimed is:

1. A micro-valve comprising:

a seat substrate having an outlet port and an orifice formed through the seat substrate, the seat substrate including a valve seat protruding from a well in the seat substrate and a support protruding from the well;

a diaphragm attached to and above the seat substrate and capable of forming a seal with the valve seat and a base, below the seat substrate, that includes an inlet channel and an outlet channel, wherein the support protruding from the well ensures that the diaphragm remains relatively flat under pressure and thereby prevents the diaphragm from cracking, and wherein the seat substrate can be manufactured with no more than two etching processes.

2. The micro-valve of claim 1, wherein the support and the valve seat protrude equal distances from the well.

3. The micro-valve of claim 1, wherein the support includes at least one of an arced region and a circular region.

4. The micro-valve of claim 1, further comprising a cover over the diaphragm.

5. The micro-valve of claim 4, wherein the cover comprises a depression.

6. The micro-valve of claim 1, wherein the diaphragm is operable to move between an open position wherein a liquid is allowed to flow between the inlet channel and the outlet channel and a closed position wherein a liquid is prevented from flowing between the inlet channel and the outlet channel.

7. The micro-valve of claim 1, further comprising a wafer that includes a measurement channel operably coupled to the outlet channel.

8. The micro-valve of claim 7, wherein the measurement channel comprises silicon.

9. A micro-valve comprising:

a valve body comprising:
  a seat substrate comprising:
    an outlet port and an orifice formed in a well in the seat substrate;
    a valve seat protruding from a bottom of the well and forming a wall around the orifice; and
    a support protruding from the bottom of the well; and
  a base joined to the seat substrate, the base comprising:
    an inlet channel connected to the orifice of the seat substrate; and
    an outlet channel connected to the outlet port of the seat substrate; and a diaphragm attached to and above the seat substrate of the valve body and capable of forming a seal with the valve seat of the seat substrate, wherein the support protruding from the bottom of the well ensures that the diaphragm remains relatively flat under pressure and thereby prevents the diaphragm from cracking, and wherein the seat substrate can be manufactured with no more than two etching processes.

10. The micro-valve of claim 9, further comprising a cover over the diaphragm.

* * * * *